March 3, 1936.  M. A. HUNT  2,032,416
CONDUIT COUPLING
Filed July 5, 1934

Inventor;
Martin A. Hunt
By Jones, Addington, Ames & Seibold,
Attys

Patented Mar. 3, 1936

2,032,416

UNITED STATES PATENT OFFICE 2,032,416

CONDUIT COUPLING

Martin A. Hunt, Chicago, Ill.

Application July 5, 1934, Serial No. 734,639

5 Claims. (Cl. 247—27)

This invention relates to couplings and more particularly to combined couplings and fitting connectors arranged for rigidly connecting adjacent ends of conduits, pipes, rods or the like. The couplings are also adapted for use in connecting conduits to outlet boxes, switch boxes, or other fittings or devices commonly provided with knock-outs for connecting purposes.

The invention is especially adapted for use in connecting conductor conduits such as commonly used for electrical conduits or for any purpose wherein it is desirable that the conduits be rigidly connected together or to their fittings in a manner whereby the entire system may be easily grounded.

The embodiment herein illustrated is shown and described in connection with the usual types of electrical conduits and outlet boxes. However, it will be understood that the invention is equally well adapted for coupling any cylindrical members, such as rods or pipes, and particularly such members having plain unthreaded ends.

In the usual type of coupling it has been common practice to either thread the ends of the conduits and tap the coupling therefor, or to provide somewhat complicated clamping devices in which a comparatively large number of parts are used. The present invention comprises only three parts, two of which are interchangeable, thereby providing a coupling which may be manufactured and furnished to the user in the knockdown, providing a great saving in the cost of manufacture as well as in the time and cost of installation.

It is an object of the present invention to provide an efficient combined coupling and fitting connector of a minimum number of parts which may be interchangeably used, and which may be easily connected to conduits or in the knockout holes of fittings, or both, and in which all of the parts will be rigidly secured together.

A further object is to provide a device of the character described through which the conductors may be easily passed without danger of injury to the insulation thereon.

Further objects will be apparent from the specification and the appended claims.

Figure 1:
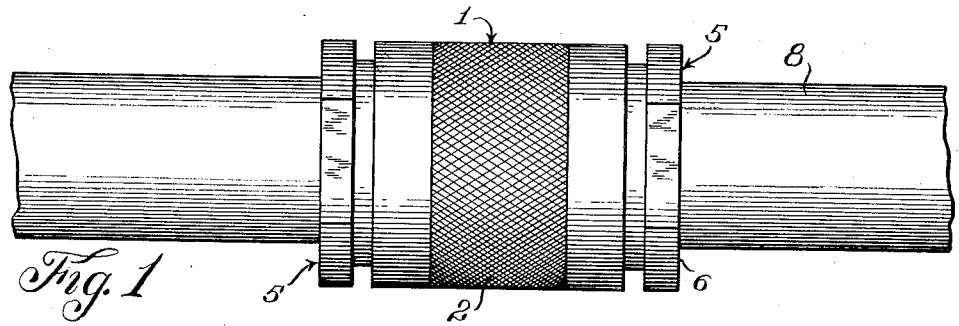
Figure 1 is a side elevation of one embodiment of the invention as applied to the ends of conduits to secure them together.

Referring to the drawing in detail, the embodiment illustrated comprises a sleeve or body member 1 which is preferably tubular in shape and may be knurled on its outer surface as illustrated at 2, whereby it may be more readily engaged when in use.

Figure 2:
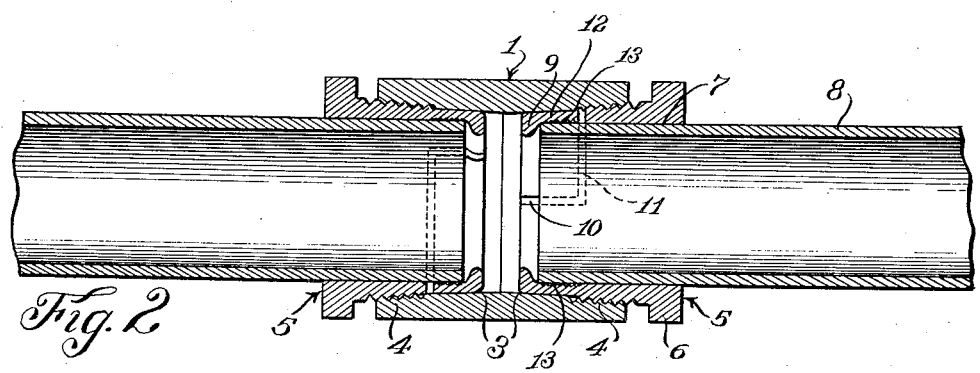
Fig. 2 is a longitudinal axial section through the embodiment illustrated in Figure 1.
Figure 3:
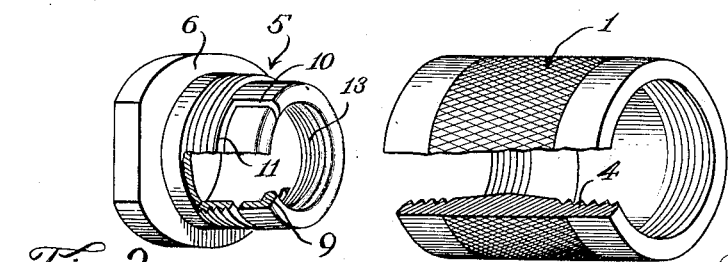
Fig. 3 is a perspective view of one of the interchangeable clamping bushings.
Figure 4:
Fig. 4 is a perspective view of the tubular sleeve or body of the coupling.

The sleeve 1 is a relatively short tubular member and is internally tapered toward its transverse center line as indicated at 3 in Fig. 2. This sleeve is internally threaded adjacent its ends at 4 to receive similarly threaded bushings 5. The bushings 5 are interchangeable and may be screwed into either end of the sleeve. Each bushing 5 is tapered in accordance with the internal tapered surface of the sleeve 1 and provided with an outwardly extending annular flange 6 adjacent its outer end which may be arranged to receive a wrench. The bushing is threaded adjacent the flange 6 to conform to the threads in the sleeve 1.

The bushings 5 are provided with a straight internal bore 7 arranged to snugly receive the end of a conduit 8. An annular inturned flange 9 is provided at the inner end of the bushing, and this flange is preferably somewhat angular on the side toward the conduit in order that the so-called "fish tail" will not catch thereon. The "fish tails" are commonly passed through the conduits preliminary to pulling conductors therethrough. The flanges 9 are also smoothly rounded in order that the insulation on the conductors may not be injured.

The bushing is provided with a short longitudinal slot 10 extending from the inner end of the bushing to a point adjacent the threads thereon. The slot 10 communicates with a long transverse slot 11 which may be extended substantially one-half of the circumference of the bushings. These slots 10 and 11 provide an annular tongue 12 on each bushing whereby when the bushing is inserted into the sleeve 1 and screwed thereon, the tapered surface of the bushing and sleeve will cooperate to force the tongue 12 inwardly as the bushing is screwed in, and thereby clamp the end of the conduit 8 securely in the bushing.

The bushings may be provided with very fine internal threads 13. The tops of these threads are normally of the same diameter as the bore 7 in the bushing. However, when the bushing is screwed snugly in place with the conduit end therein, the resilient tongue 12 will be pressed inwardly by the cam-like tapered surfaces, and the threads 13 will grip the conduit securely. Instead of using the fine threads 13, the inner surface of the bushing may be knurled, if desired, which serves equally well for some purposes. Although the threads 13 are shown and described herein and have some advantages, they are usually omitted and the bushing is provided with a smooth, cylindrical surface which has been found to be entirely satisfactory for ordinary purposes.

Figure 5:
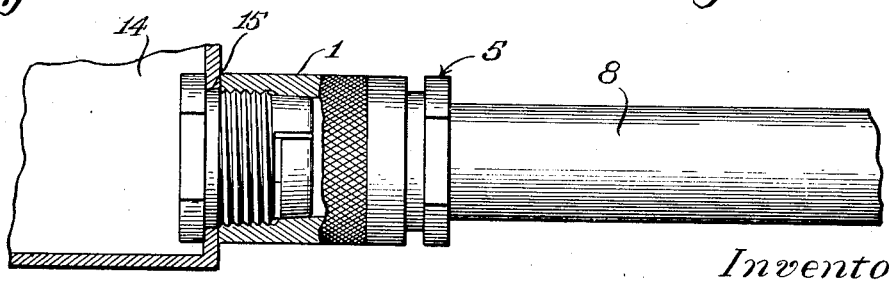
Fig. 5 is a side elevation, partially in axial section, illustrating the method of attaching a conduit to an outlet box or other fitting having a knock-out opening.

In Fig. 5 the coupling is shown in combination with the usual outlet box 14 having a knock-out opening 15, through which the bushing 5 may be inserted from inside the box and screwed snugly into the sleeve 1. The box 14 will then be clamped securely between the flange 6 and the sleeve 1. The opposite end of the coupling is connected to a conduit end in the manner previously described.

It will be understood that the bushing 5 may be inserted through the knock-out hole from outside the box and the sleeve be screwed on from the inside, if desired, and at the same time a conduit may be clamped in the same bushing. This is sometimes desirable in restricted places.

Modification may be made in detail by those skilled in the art and it is desired, therefore, that the invention be limited only by the prior art and the scope of the appended claims.

Having thus described the invention what is claimed and desired to be secured by Letters Patent is:

1. A conduit coupling of the character described comprising a sleeve having its bore tapering toward the center and threaded adjacent its ends, interchangeable bushings in said sleeve, each bushing having its outer end a complete annulus threaded to conform to the sleeve threads and its inner end tapered to conform to said sleeve taper, the inner ends being slit to form an annular tongue contractible by said tapers to clamp conduits therein.

2. A conduit coupling of the character described comprising a sleeve having its bore tapering toward the center and threaded adjacent its ends, interchangeable bushings in said sleeve, the outer end of each bushing being a complete annulus threaded to conform to the sleeve threads and its inner end tapered to conform to said sleeve taper, the inner ends having resilient annular unthreaded tongues operable by said tapers to clamp conduits in said bushings.

3. A combined coupling and fitting connector comprising a tubular sleeve having its inner surface tapering toward the center and threaded adjacent each end, a tapered integral bushing threaded into each end and having a lateral flange, said bushings having substantially straight bores to receive conduits and inturned flanges adjacent their inner ends to provide abutments for the ends of said conduits, said bushings being externally tapered toward their inner ends and being slotted to form annular unthreaded tongues adjacent their inner ends whereby when the bushings are screwed into the body the tongues are snugly clamped onto the conduits.

4. In a coupling of the character described, a tubular sleeve having a bore tapering toward the center and internally threaded adjacent each end, an integral clamping bushing having an outturned annular flange at its outer end and an inturned annular flange at its inner end, said bushing having a bore snugly fitting a conduit inserted therein with its end abutting said inner flange, an inwardly tapered unthreaded outer surface on said bushing for cooperation with the tapered inner surface of the sleeve, threads on said bushing cooperating with the threads on said sleeve, an annular tongue at the end of said bushing beyond said threads and arranged for compression against said conduit when said bushing is screwed into said sleeve.

5. A coupling comprising a sleeve having a bore tapering inwardly from each end and threaded adjacent each end, an integral bushing threaded adjacent its outer end for insertion in either end of said sleeve and having a straight bore to snugly receive a conduit, an inwardly extending annular flange at the inner end of said bore to provide a stop for said conduit, the outer surface of said bushing beyond the threaded portion conforming to the taper of the unthreaded portion of said sleeve, the unthreaded portion of said bushing being longitudinally and transversely slit to form a resilient annular tongue in said unthreaded portion, and a closed threaded portion, said tapers cooperating to clamp the unthreaded portion of said bushing snugly around a conduit, said tongue and threads being related to resist rotation of the bushing in one direction and enable free rotation in the opposite direction.

MARTIN A. HUNT.